United States Patent
Challener et al.

(10) Patent No.: US 8,312,534 B2
(45) Date of Patent: Nov. 13, 2012

(54) SYSTEM AND METHOD FOR SECURELY CLEARING SECRET DATA THAT REMAIN IN A COMPUTER SYSTEM MEMORY

(75) Inventors: David Carroll Challener, Raleigh, NC (US); Daryl Carvis Cromer, Cary, NC (US); Howard Jeffrey Locker, Cary, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1276 days.

(21) Appl. No.: 12/040,953

(22) Filed: Mar. 3, 2008

(65) Prior Publication Data

US 2009/0222915 A1  Sep. 3, 2009

(51) Int. Cl.
  G06F 21/00 (2006.01)
  G06F 17/00 (2006.01)
  G06F 17/30 (2006.01)
  G06F 15/177 (2006.01)

(52) U.S. Cl. .............. 726/21; 726/1; 726/2; 726/26; 713/2

(58) Field of Classification Search .......... 380/277; 713/100, 189, 193, 2; 726/16, 17, 18, 26, 726/1, 2, 21
See application file for complete search history.

(56) References Cited

U.S. PATENT DOCUMENTS

| 6,480,982 | B1 | 11/2002 | Chan et al. ............ 714/764 |
| 6,560,725 | B1 * | 5/2003 | Longwell et al. ......... 714/54 |
| 6,757,832 | B1 | 6/2004 | Silverbrook et al. ....... 713/194 |
| 7,646,873 | B2 | 1/2010 | Lee et al. ............. 380/277 |
| 7,725,703 | B2 | 5/2010 | Hunter et al. ............ 713/2 |
| 2002/0159601 | A1 * | 10/2002 | Bushmitch et al. ......... 380/277 |
| 2003/0028771 | A1 * | 2/2003 | Kocher et al. .......... 713/172 |
| 2003/0135794 | A1 | 7/2003 | Longwell et al. .......... 714/42 |
| 2003/0196100 | A1 | 10/2003 | Grawrock et al. ......... 713/193 |
| 2006/0071981 | A1 * | 4/2006 | Plunkett ................. 347/59 |
| 2006/0247849 | A1 * | 11/2006 | Mohsini et al. .......... 701/206 |
| 2007/0005985 | A1 * | 1/2007 | Eldar et al. ............ 713/183 |
| 2007/0006226 | A1 * | 1/2007 | Hendel ................. 718/1 |
| 2008/0120710 | A1 * | 5/2008 | Holz et al. .............. 726/7 |
| 2008/0134321 | A1 * | 6/2008 | Rajagopal et al. ......... 726/21 |
| 2008/0189557 | A1 * | 8/2008 | Pipitone et al. .......... 713/193 |
| 2008/0235505 | A1 * | 9/2008 | Hobson et al. .......... 713/100 |
| 2009/0172806 | A1 | 7/2009 | Natu et al. ............. 726/16 |
| 2010/0005317 | A1 | 1/2010 | Pribadi et al. .......... 713/193 |

OTHER PUBLICATIONS

U.S. Appl. No. 12/040,981, filed Mar. 3, 2008, Challener et al.
Kauer, "OSLO: Improving the security of Trusted Computing," 2007.
Schmidt, "Trusted Computing: Introduction & Applications," 2007.

(Continued)

*Primary Examiner* — April Shan
*Assistant Examiner* — Shu Chun Gao

(57) ABSTRACT

A system, method, and program product is provided that initializes a counter maintained in a nonvolatile memory of a security module to an initialization value. The security module receives requests for a secret from requesters. The security module releases the secret to the requesters and the released secrets are stored in memory areas allocated to the requesters. A counter is incremented when the secret is released. Requestors send notifications to the security module indicating that the requestor has removed the secret from the requestor's memory area. The security module decrements the counter each time a notification is received. When the computer system is rebooted, if the counter is not at the initialization value, the system memory is scrubbed erasing any secrets that remain in memory.

14 Claims, 9 Drawing Sheets

OTHER PUBLICATIONS

Office Action for co-pending U.S. Appl. No. 12/040,981, mailed Nov. 24, 2010, 14 pages.

Final Office Action for U.S. Appl. No. 12/040,981, mailed May 2, 2011, 16 pages.

* cited by examiner

SYSTEM AND METHOD FOR SECURELY CLEARING SECRET DATA THAT REMAIN IN A COMPUTER SYSTEM MEMORY

BACKGROUND OF THE INVENTION

1. Technical Field

The present invention relates to a system and method that securely clears secret data from computer system memory. More particularly, the present invention relates to a system and method that securely clears secret data that has been provided by a Trusted Platform Module (TPM).

2. Description of the Related Art

Security of sensitive data and intellectual property is of increased concern in modern computer systems. To address this concern, special security modules, such as a Trusted Platform Module (TPM) have been developed and incorporated in computer systems in order to perform various security and cryptographic functions. The security module (hereinafter, the TPM) releases sensitive ("secret") data only when the requestor has been properly authenticated.

While the TPM is quite useful in only releasing secrets when proper authentication is provided, a challenge exists with ensuring that secrets, having been released to authenticated requesters, are not compromised when the system is re-booted. For example, a requestor might store a secret in RAM that has been allocated to the requestor, but when the system is re-booted the RAM where the secret was stored no longer belongs to the original requestor and may fall into the hands of a malevolent user. One approach is to have requestors clean up (e.g. write over) the secret once the requestor is finished using it. A challenge to this approach is that the system can generally be booted at any time and, therefore, the requestor might not have the opportunity to clean up the memory where secrets are stored prior to a re-boot. Another approach would be to clear (write over) all of the RAM every time the system is rebooted so that any secret data would be written over before the system could be used by a malevolent user. The substantial challenge to this approach is that modern systems often contain many megabytes of RAM and, consequently, this approach would often require a long amount of time to clear all of the memory and would likely lead to user frustration and dissatisfaction in waiting such a long time before being able to use the system.

SUMMARY

It has been discovered that the aforementioned challenges are resolved using a system, method and computer program product that initializes a counter maintained in a nonvolatile memory of a security module (e.g., a TPM) to an initialization value, such as zero. The security module receives requests for a secret that is secured by the security module. The requests are received from requesters, such as processes and applications running on the computer system. The security module releases the secret to the requesters and the released secrets are stored in memory areas allocated to the requesters (e.g., system RAM). Each time the secret is released by the security module a counter is incremented. When a requestor is finished using the secret, it sends a notification to the security module that indicates that the requestor has removed the secret from the requestor's allocated memory area. The security module then decrements the counter each time one of the notifications is received.

When the computer system is rebooted, the counter is compared to the initialization value to determine if notifications were not received from one of the requesters during the previous running of the computer system. If the counter was not decremented back to the initialization value (e.g., zero), then a memory area is scrubbed. The memory area that is scrubbed includes the memory areas where the secret was stored in system memory (RAM).

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
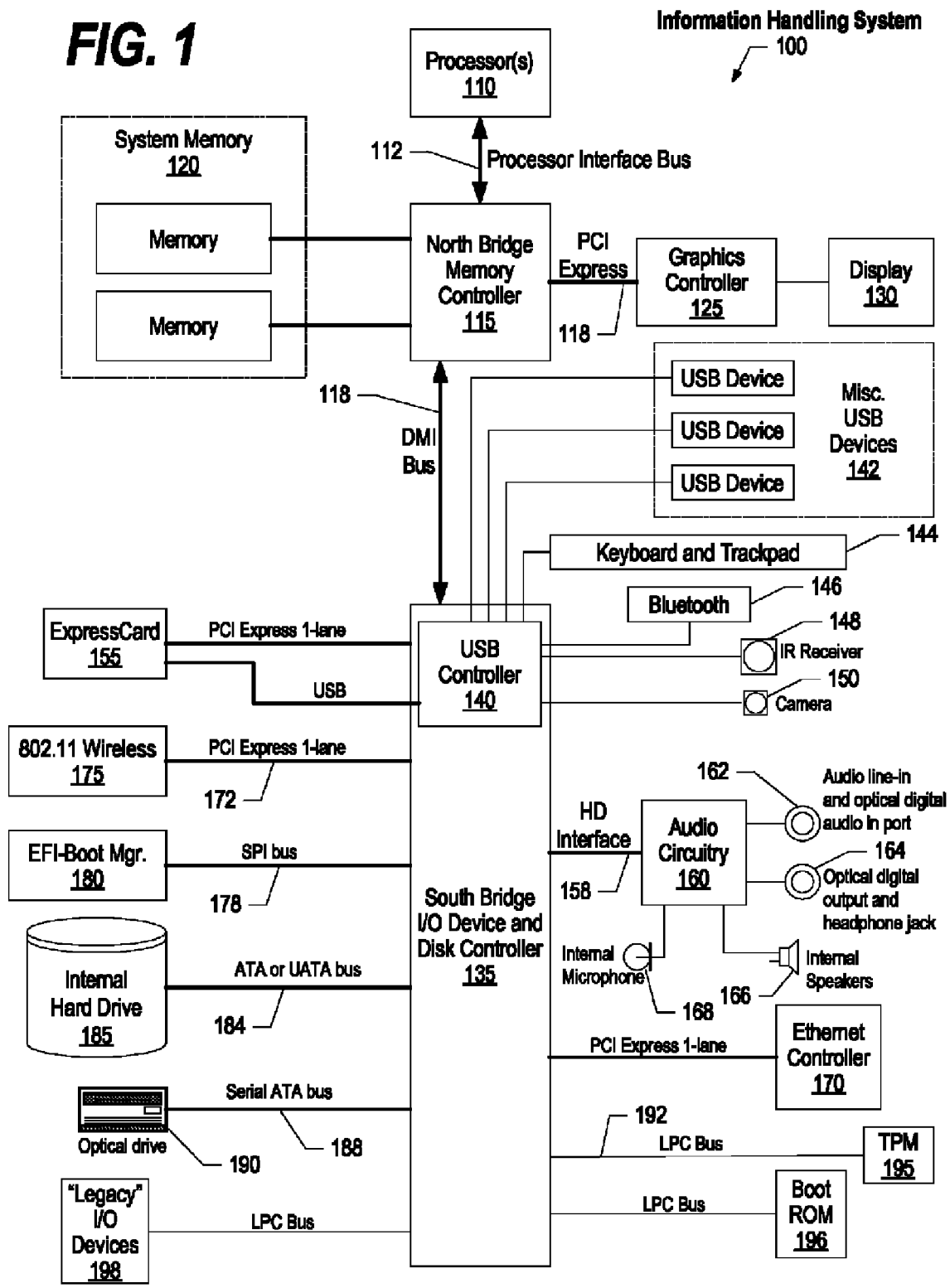
FIG. 1 is a block diagram of a data processing system in which the methods described herein can be implemented.
Figure 2:
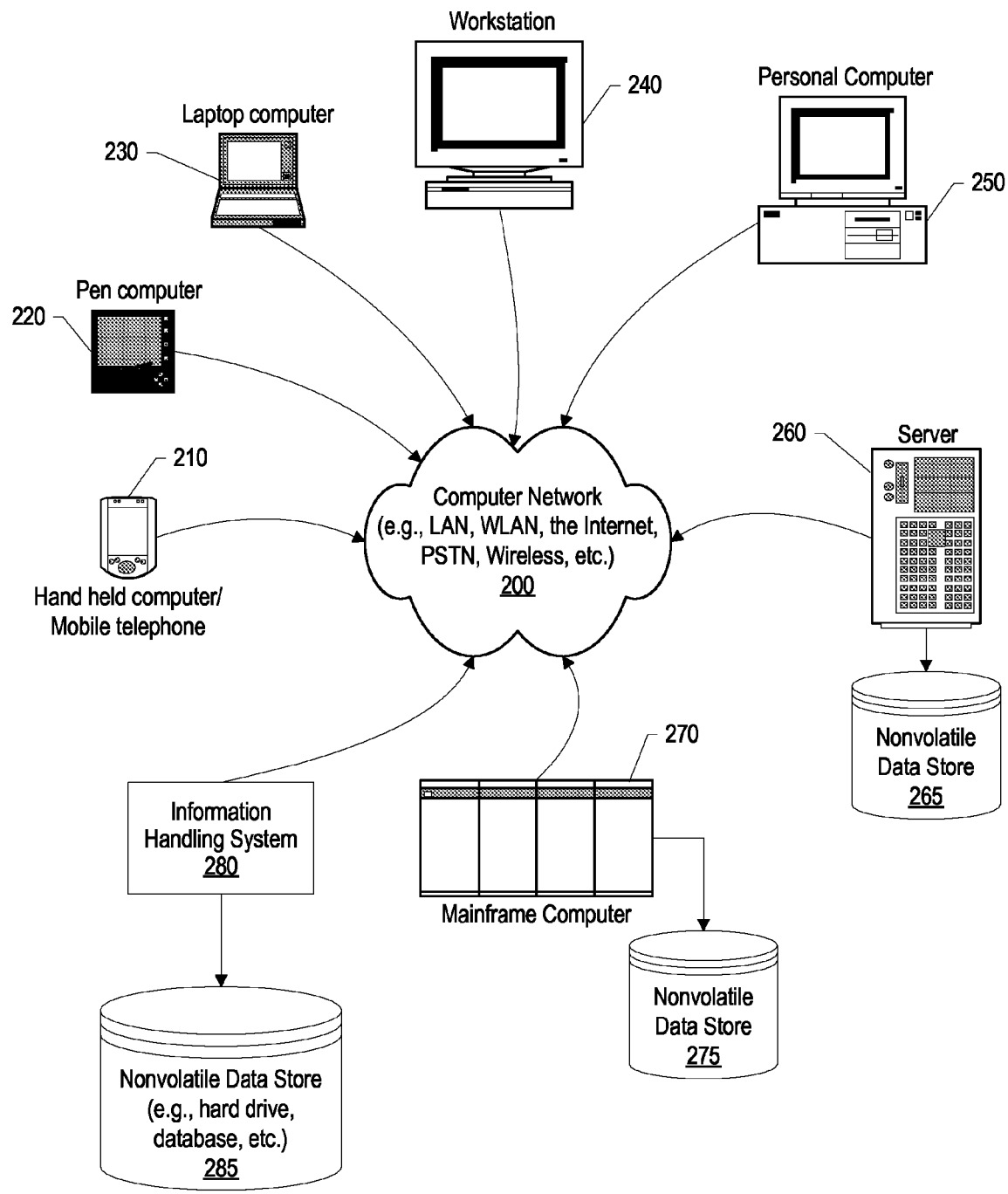
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
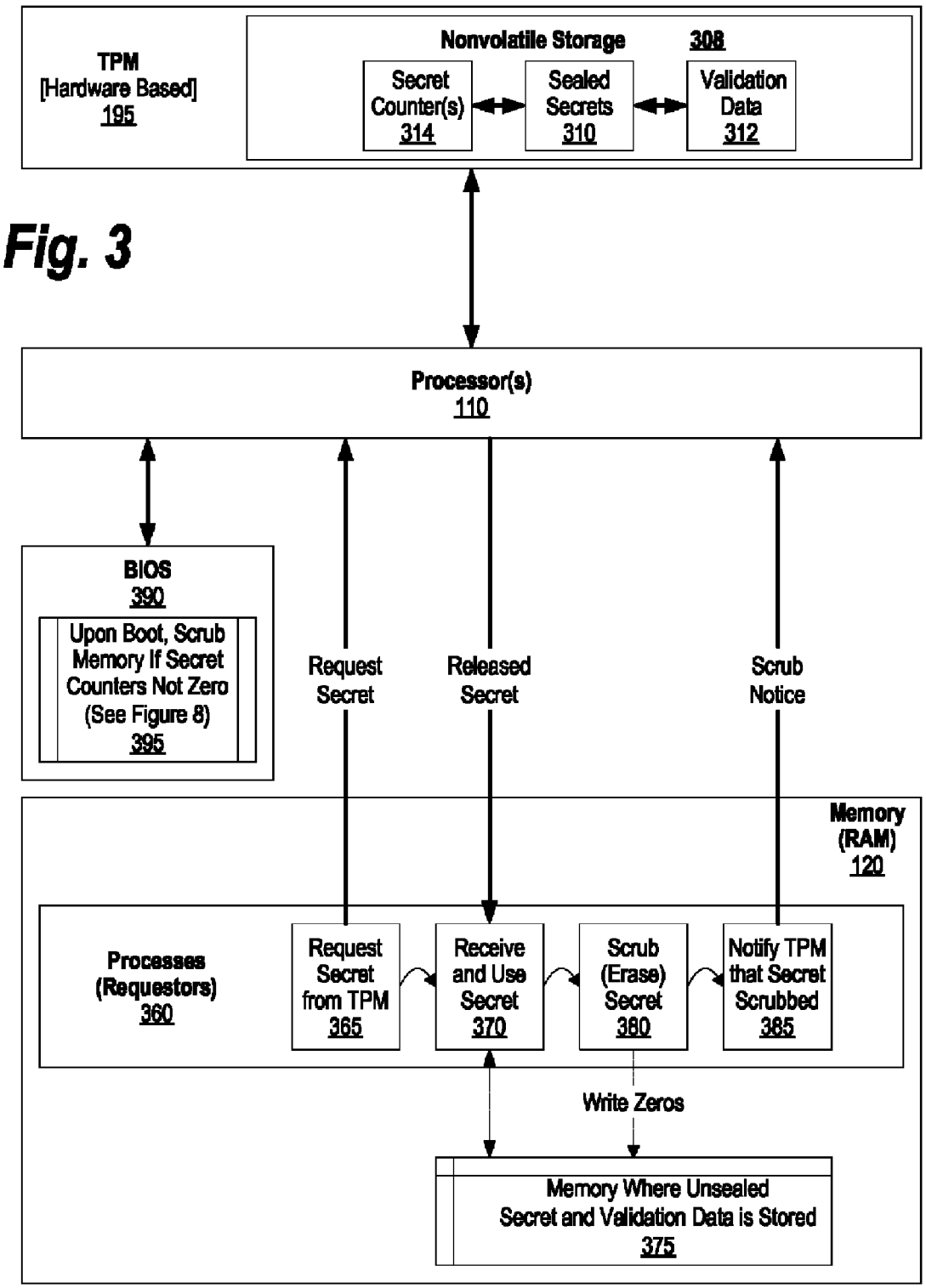
FIG. 3 is a high level diagram showing the interaction between the Trusted Platform Module (TPM) and the application that is using the secrets to keep a counter corresponding to the various secrets maintained by the TPM.

FIG. 3 is a high level diagram showing the interaction between the Trusted Platform Module (TPM) and the application that is using the secrets to keep a counter corresponding to the various secrets maintained by the TPM. TPM 195 is a security module that, among other activities, safeguards secrets (e.g., encryption keys, etc.) so that unauthorized (e.g., malevolent) users and processes are unable to retrieve and abuse the secrets. As shown, TPM 195 includes nonvolatile storage 308, such as nonvolatile memory, in which secrets 310 are stored. As explained in further detail herein, TPM 195 has counters 314 that keep track of the number of times a secret has been requested. These counters are decremented when the requesting process informs the TPM that the process has erased the secret from memory and is no longer using the secret. To ensure that malevolent users and processes do not decrement counters, validation data 312 is used, as will be explained in further detail below.

Processes 360 include instructions that are executed by processor(s) 110 of an information handling system, such as information handling system 100 shown in FIG. 1. Some of these processes are "requesters" of secrets 310 that are maintained by TPM 195. At step 365, a process requests a secret (e.g., an encryption key) from the TPM. The TPM performs authentication processes to ensure that the secret is only provided to authenticated requesters. If authentication is successful, then TPM 195 releases the secret to the requester where, at step 370, the requestor receives and uses the secret (e.g., uses an encryption key to encrypt a file or data packet, etc.). While using the secret, the requester stores the secret in memory (e.g., RAM) that has been allocated to the requester (memory 375). The operating system ensures that malevolent users and processes cannot access the memory that has been allocated to the requestor process.

In one embodiment, when the TPM releases the secret to the requesting process it also sends validation data to the requestor. The validation data is used by the requestor when notifying the TPM that the requestor is no longer using the secret and has scrubbed the memory where the secret was stored in memory 375. At step 380, the requestor is finished using the secret and scrubs the memory so that the secret no longer remains in memory 375. In one embodiment, the requestor scrubs the memory by invoking a command (or commands) that writes a value (e.g., zeros) to the memory location where the secret was stored in memory 375. At step 385, the requestor sends a notification to the TPM that informs the TPM that the requestor is no longer using the secret. In the embodiment that uses validation data, the notification would be accompanied by validation data that corresponds to the original validation data that was sent by the TPM. The TPM checks to make sure that the validation data sent by the process corresponds to the validation data that was used when the secret was released. In one embodiment, the same validation data value (e.g., a random number) when the secret is released as well as when the notification is sent that the secret is no longer being used or stored by the requestor. In another embodiment, the validation data value sent by the TPM corresponds to the expected validation data value but is not the same value. For example, the validation data value that was sent may be processed by an algorithm to generate the expected validation data value. If the validation data value sent with the notification does not correspond to (e.g., is not equal to) the expected validation value stored in validation data 312 then the counter is not decremented. On the other hand, if the validation value does correspond to the expected validation value (or if validation values are not being used in the implementation), then the counter corresponding to the secret is decremented. In one embodiment, each secret has a separate counter value that is incremented and decremented as outlined above and as further described herein. In another embodiment, a single counter is maintained for all secrets and this counter is incremented each time any secret is released and is also decremented each time any secret is accounted for by the requestor (e.g., whenever a notification is received from a requestor).

As outlined in the Background Section, above, in a traditional system once the computer system is rebooted the memory is no longer allocated to the requesting process by the operating system, which may allow a malevolent user or process to obtain the secret that was stored in memory 375. To prevent this from happening, secure BIOS 390 operates to scrub memory 375 if, during the boot process, it is discovered that any of the counters that track usage of secrets are not set to zero. In one embodiment, the BIOS receives the counter value(s) from TPM 195. The BIOS checks that each of the counters are set to the initialization value (e.g., zero). Predefined process 395, executed by secure BIOS 390, is responsible for scrubbing memory 375 (e.g., writing zeros to the memory addresses) if any counters corresponding to any of the secrets are not at their initialization value (e.g., zero) when the system is booted. If all of the counters are set to their initialization values, then BIOS 390 does not scrub the memory as no secrets are in jeopardy.

Figure 4:
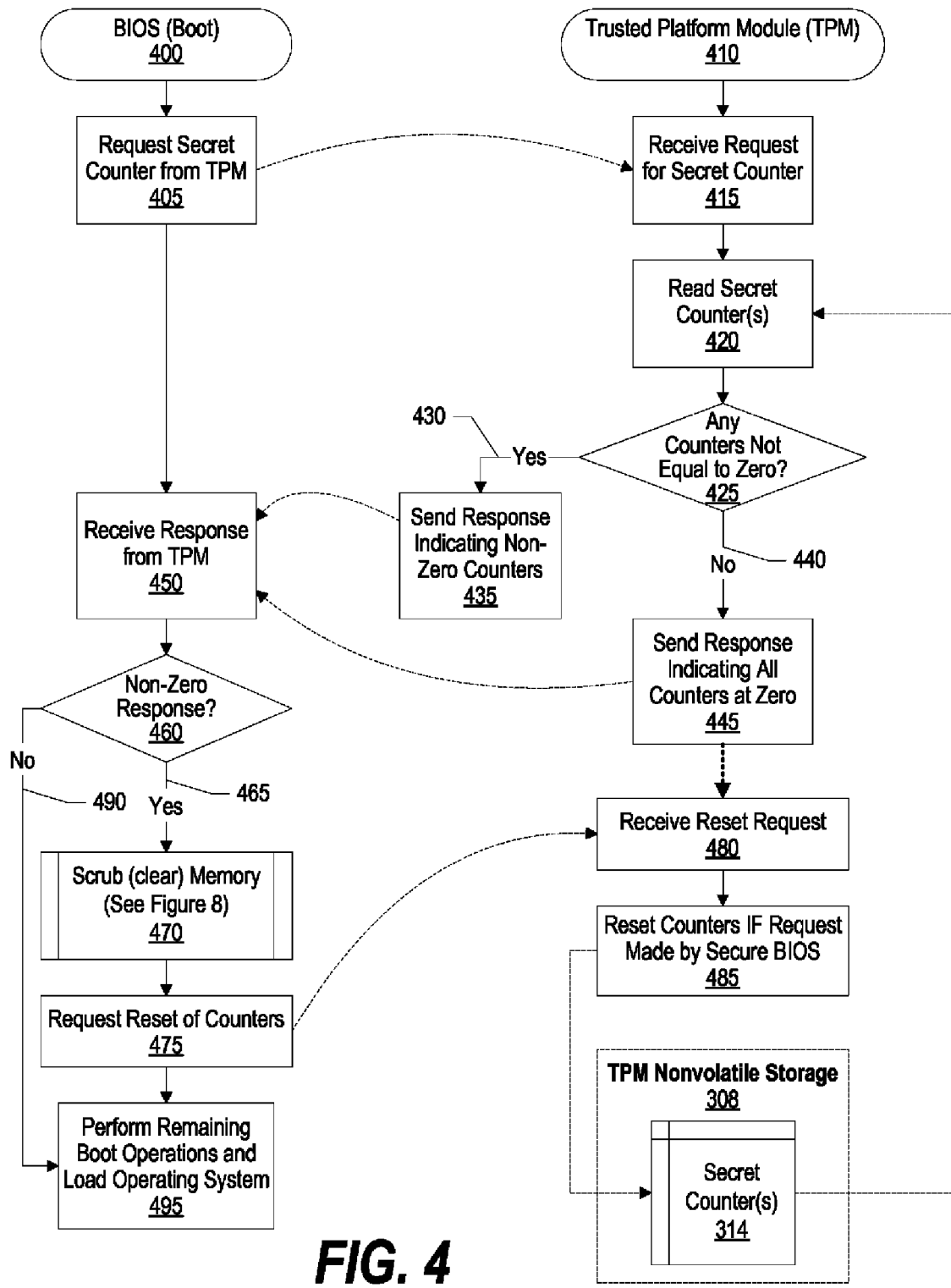
FIG. 4 is a flowchart showing steps by the BIOS and the TPM when booting a system and checking whether any secrets are potentially at risk and handling the situation accordingly.

FIG. 4 is a flowchart showing steps by the BIOS and the TPM when booting a system and checking whether any secrets are potentially at risk and handling the situation accordingly. Secure BIOS 400 processing commences at 400 when the computer is initialized (e.g., re-booted with a command such as ctrl+alt+del or booted by having a main power switch of the computer system turned "ON", etc.). At step 405, before a user or application program is able to use the system, the secure BIOS requests secret counter data from the TPM. As previously mentioned, in one embodiment a counter is maintained for each secret managed by the TPM while in another embodiment an overall counter is maintained for all secrets managed by the TPM. TPM processing commences at 410 where, at step 415, the TPM receives the request from the secure BIOS for the counter data. At step 420, the TPM reads secret counter data 314 from the TPM's nonvolatile storage 308, such as the TPM's nonvolatile memory. A determination (decision 425) is made by the TPM as to whether any of the counters are not equal to the counter's initialization value, such as zero (0). If any of the counters are not equal to zero, then decision 425 branches to "yes" branch 430 whereupon, at step 435, the TPM returns a response to the secure BIOS (the caller) indicating that there are counter values that are not equal to their expected initialization values (e.g., zero). On the other hand, if the counters are all equal to the initialization values, then decision 425 branches to "no" branch 440 whereupon, at step 445, the TPM returns a response to the secure BIOS indicating that all counter values are as expected (i.e., equal to their respective initialization values, such as zero).

Returning to secure BIOS processing, at step 450, the secure BIOS receives a response from the TPM regarding the counter values. A determination is made as to whether the response indicates that at least one counter is not at its expected initialization value (decision 460). If one or more counters are not at their expected initialization values, then decision 460 branches to "yes" branch 465 whereupon, at step 470, the memory that was used by the processes that accessed the secrets is scrubbed. In one embodiment, scrubbing the memory includes writing a predetermined value, such as zeros, to the memory locations included in the memory. After the memory has been scrubbed, at step 475, the secure BIOS requests that the secret counters be reset to their initialization values (e.g., zero). At step 480, the TPM receives the request to reset the secret counters and, at step 485, the TPM resets the counters but only if the TPM determines that the computer system is in a secure state (e.g., under the control of the secure BIOS).

Returning to secure BIOS processing, if the response received from the TPM at step 450 indicates that the counters are all at their expected initialization values, then decision 460 branches to "no" branch 490 bypassing step 470 and 475. At step 495, either after scrubbing memory if counters are not at their initialization values or if steps 470 and 475 have been bypassed, the remaining boot operations, including any user-configurable or non-secure BIOS operations, are performed and the BIOS also executes a bootstrapping process that loads the operating system, such as a Windows-based operating system distributed by Microsoft Corporation. In a second embodiment, a hypervisor is loaded and communicates with the TPM.

In this second embodiment, guest operating systems are loaded under the hypervisor and one or more virtual machines (VMs) may be executed by the hypervisors. In this second embodiment, the hypervisor, or one of the VMs, interfaces with the TPM and the operating systems do not directly communicate with the TPM. Instead, the operating systems communicate with the hypervisor (or with a VM running in the hypervisor) to make TPM requests. In this second embodiment, memory can be segregated into hypervisor memory that is used by the hypervisor and the virtual machines and non-hypervisor memory that is used by the operating systems (e.g., guest operating systems, etc.). In this manner, using the hypervisor and/or virtual machines to facilitate communications between the TPM and applications or processes running in the operating systems, the secrets released by the TPM will only be stored in the hypervisor's memory area and will not be stored in the operating systems memory area. Using this embodiment, if a counter is not at its initial value when the system is booted, only the hypervisor memory (or areas thereof) would have to be scrubbed because any released secrets would only be stored in the hypervisor memory. Taking as an example, a system with 8 GB of RAM that is segregated so that 1 GB of RAM is dedicated to the hypervisor and any of its virtual machines and 7 GB is dedicated to primary and guest operating systems, only 1 GB of memory (or less) would have to be scrubbed rather than all 8 GBs of memory, so long as the hypervisor and its virtual machines are programmed to ensure that the secrets are only stored in memory segregated to the hypervisor.

Figure 5:
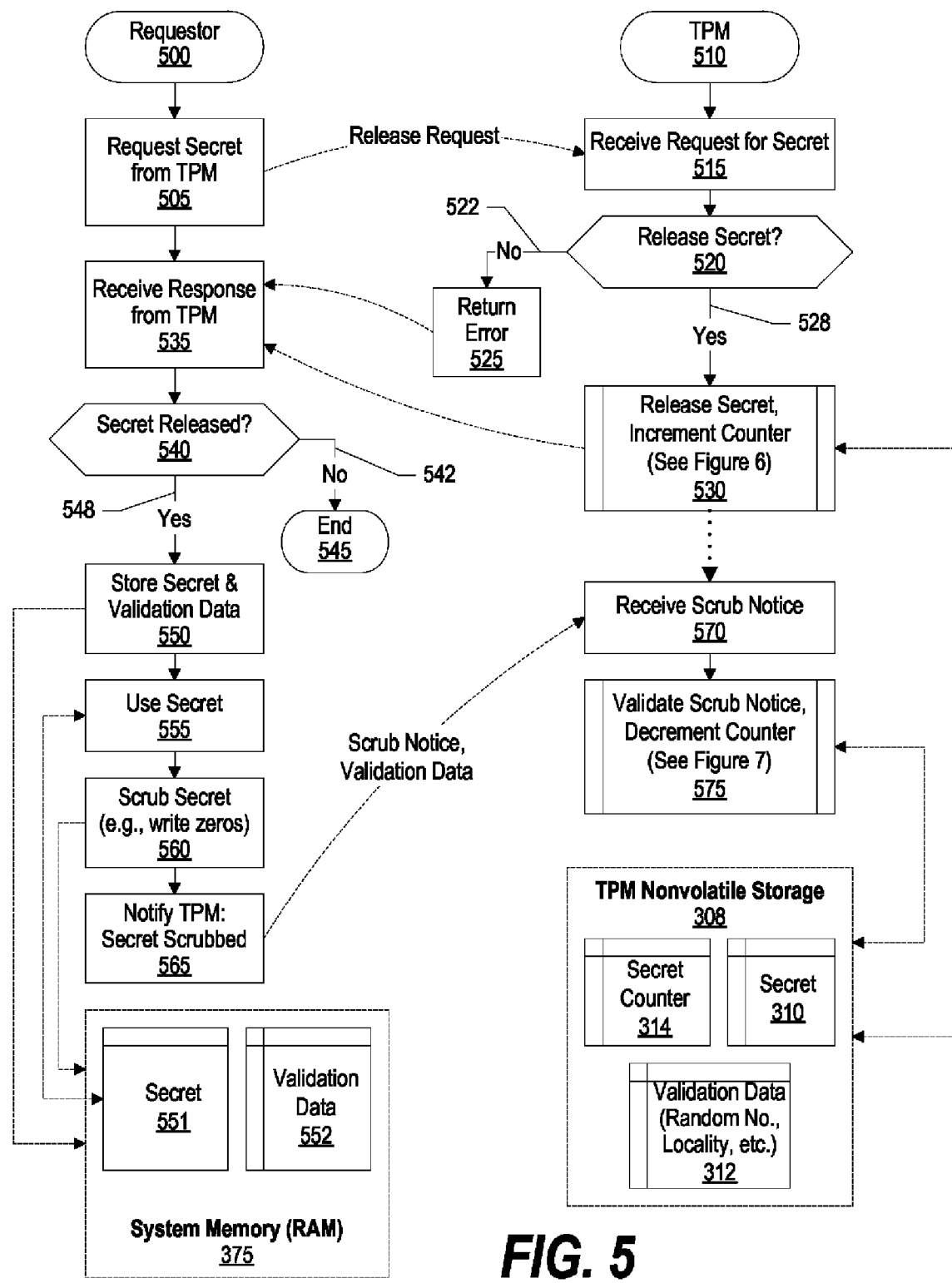
FIG. 5 is a flowchart showing the interaction between the requesting application and the TPM in releasing secrets and accounting for secrets that have been scrubbed by the application.

FIG. 5 is a flowchart showing the interaction between the requesting application and the TPM in releasing secrets and accounting for secrets that have been scrubbed by the application. Requestor processing is shown commencing at 500. In one embodiment, the requestor is a software application running under the control of an operating system. In a second embodiment, introduced in the discussion of FIG. 4, the requestor is a process running in a hypervisor or a virtual machine executed by a hypervisor.

Processing commences at 500 whereupon, at step 505 the requestor sends a request to the TPM for a particular secret. TPM processing commences at 510 whereupon, at step 515, the TPM receives the request for the secret. A determination is made by the TPM (e.g., based on PCR values, etc.) as to whether to release the secret to the requester (decision 520). If the TPM decides not to release the requested secret, then decision 520 branches to "no" branch 522 whereupon, at step 525 an error is returned to the requestor.

On the other hand, if the TPM decides to release the secret to the requestor, then decision 520 branches to "yes" branch 528 whereupon, at predefined process 530, the secret is released to the requestor and the counter is incremented. As previously described, in one embodiment a counter is maintained for each secret that is released, while in another embodiment, a single counter is maintained for all of the combined secrets that are released. In addition, as known by those skilled in the art, the process of "incrementing" and "decrementing" can be performed in many ways. In one embodiment, a positive value (e.g., +1) is used when incrementing and a negative value (e.g., −1) is used when decrementing. However, the incrementing can also be implemented in a "countdown" fashion. For example, the counters can be initialized to a high initialization value and these values can be incremented by a negative number (e.g., −1) to keep track of the number of times a secret was released (such as in a system where a maximum number of "releases" is implemented). In this example, consequently, the decrementing would be performed by adding a positive number (e.g., +1) so that, if all of the releases are accounted for, the ending counter value is again equal to the initialization value.

Returning to requestor processing, at step 535 the requestor receives a response from the TPM. A determination is made as to whether the secret was released to the requester (decision 540). If the secret was not released, then decision 540 branches to "no" branch 542 whereupon processing ends with an error at 545. On the other hand, if the secret was released to the requestor, then decision 540 branches to "yes" branch 548 whereupon, at step 550, the secret is stored in memory 551 that has been allocated within system memory 375 to the requestor. If validation data is being used to notify the TPM when the requestor has scrubbed the secret, then the validation data is stored in memory 552 which is also memory that has been allocated within system memory 375 to the requestor. As previously introduced, in one embodiment, memory is segregated between the hypervisor (and its virtual machines) and non-hypervisor applications. In this embodiment, the memory that is allocated to the requester (memory areas 551 and 552) are allocated from the hypervisor's memory area as the requestor is either a hypervisor process or a virtual machine running under the hypervisor.

At step 555 the requestor uses the secret (e.g., to encrypt or decrypt data when the secret is an encryption key, etc.). When the requestor is finished using the secret, at step 560, the requestor scrubs the memory area where the secret was stored (e.g., by writing zeros to memory area 551, using a hardware command designed to clear memory area 551, etc.). At step 565, the requestor sends a notification to the TPM that the secret has been scrubbed from the requestor's memory. If validation data is being used in conjunction with sending the notification, then validation data is also sent to the TPM by the requestor at step 565. In one embodiment, the validation data returned to the TPM is the same validation data that the TPM sent to the requestor (e.g., a random number generated by the TPM, etc.). In another embodiment, the validation data returned to the TPM is a second validation value that corresponds to the validation value initially sent by the TPM but is not the same exact value (e.g., executing an algorithm using the initial validation value to generate the second validation value that can then be verified by the TPM, etc.).

Turning now to TPM processing, at step 570, the TPM receives the notification from the requestor that the secret has been scrubbed (i.e., cleared from the requestor's memory). In one embodiment, the notification received by the TPM includes an identification of the secret that was scrubbed. In one embodiment, the notification received by the TPM includes an identification of the requestor that is sending the notification. In another embodiment, the notification includes validation data (either the same validation data sent by the TPM or a second validation value that corresponds to the validation value sent by the TPM). The various embodiments can be combined as needed.

At predefined process 575, the TPM validates the notification as needed and, if the notification is valid, decrements the counter. To perform predefined process 575, the TPM uses data maintained in the TPM's nonvolatile storage 308 that is inaccessible outside of the TPM. This data includes the secret counter (314), and validation data 312 (if validation is being used to decrement the counter).

Figure 6:
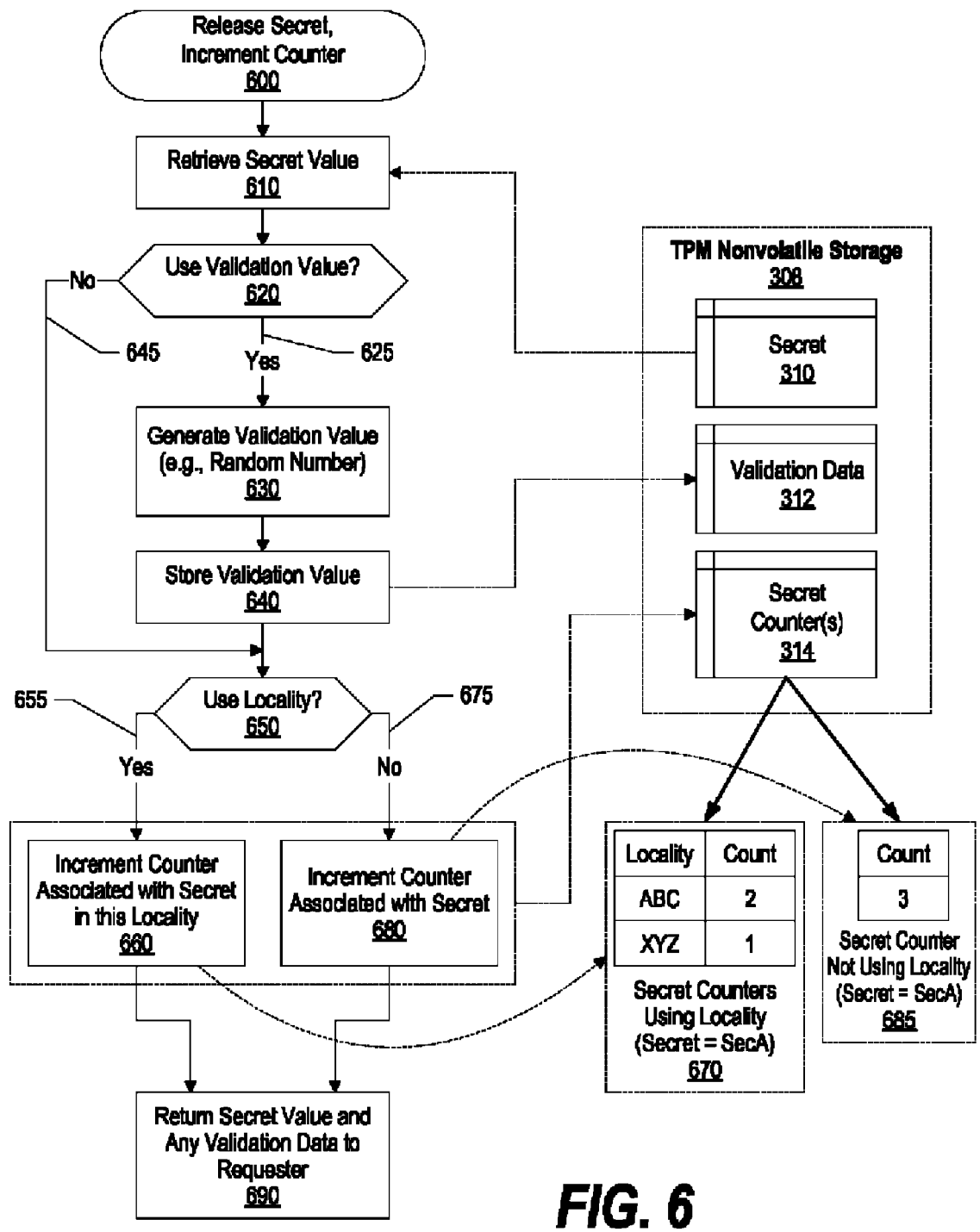
FIG. 6 is a flowchart showing steps performed by the TPM to release a secret and increment the counter corresponding to the secret.

FIG. 6 is a flowchart showing steps performed by the TPM to release a secret and increment the counter corresponding to the secret. TPM processing commences at 600 whereupon, at step 610, the secret is retrieved from secret memory area 310 within the TPM's nonvolatile storage (memory) 308. A determination is made as to whether a validation data (a validation value) is being used (decision 620). If a validation value is being used, then decision 620 branches to "yes" branch 625 whereupon, at step 630, a validation value is generated, such as a random number. At step 640, the generated validation value is stored in validation data memory 312 within the TPM's nonvolatile storage 308. Returning to decision 620, if validation data is not being used, then decision 620 branches to "no" branch 645 bypassing steps 630 and 640.

A determination is made as to whether localities are being used to store counters associated with secrets (decision 650). Localities are used when memory is segregated between the hypervisor and other entities, such as operating systems. If memory is segregated, then one locality can be established for the hypervisor, and other localities can be established for other units of memory segregation, such as operating systems and the like. In this manner, the counters can keep track of the localities that have received secrets so that, upon booting, only the memory of localities with non-zero counters will have all or part of their memory scrubbed. If the scrubbing routine can ascertain where (which memory addresses) were used by the locality to store secrets, then just those memory addresses will be scrubbed. However, if the scrubbing routine cannot ascertain which memory addresses were used to store secrets, then all of the memory in a locality will be scrubbed. Using an example of a system with three localities each of which includes 2 GB of memory, then, upon system startup, if one of the localities has a secret count not equal to zero, then just the memory in that locality would be scrubbed (at worse case, 2 GB). However, in the same system if localities were not being used with the system having 6 GB of system memory, then if the scrubbing process cannot ascertain where in memory the secrets were stored, then the scrubbing process would scrub all 6 GB of memory, taking roughly three times as long as the worse case if the memory was segregated into localities.

If memory is segregated into localities, then decision 650 branches to "yes" branch 655 whereupon, at step 660, the counter that is associated with the locality where the secret is being released is incremented. Secret counters 314 are shown with two different implementations. Secret counter implementation 670 shows secrets being incremented based on locality, while secret counter implementation 685 shows the counter being incremented without using locality data. Moreover, each implementation can be used to count the release of individual secrets or the overall release of secrets. If only the overall release of secrets is being maintained, then implementation 670 will have a count of the total secrets released to the various localities while implementation 685 will have a total count of secrets released to any process in the computer system. Returning to decision 650, if localities are not being used to track the release of secrets, then decision 650 branches to "no" branch 675 whereupon, at step 680, the counter (685) is incremented.

At step 690, the secret value that was requested is returned to the requestor. In addition, if validation values are being used, then the validation value generated in step 630 is also returned to the requestor. This validation value will be used, either directly or indirectly, when the requester notifies the TPM that the requester is no longer using the secret and has scrubbed the memory where the secret was stored.

Figure 7:
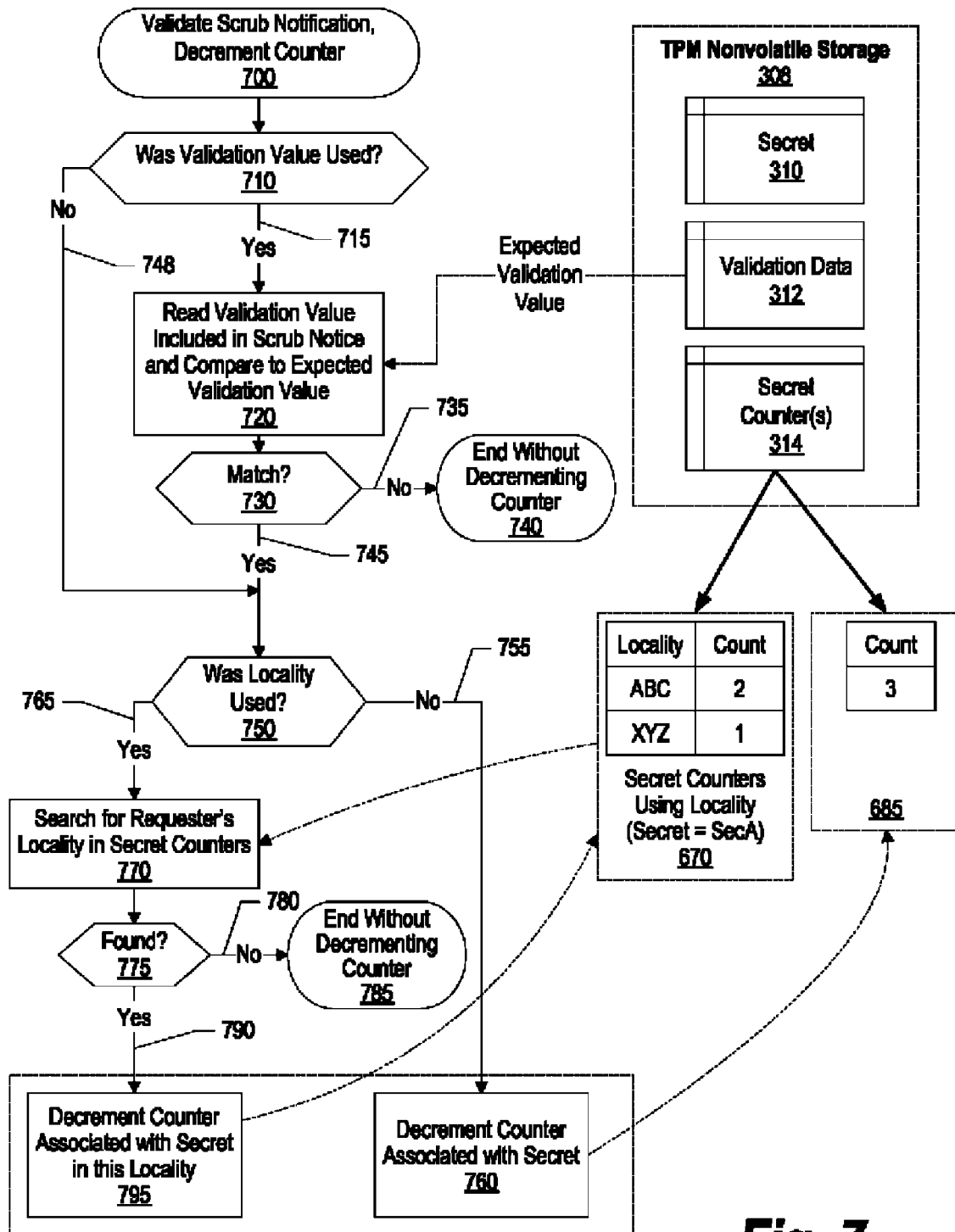
FIG. 7 is a flowchart showing steps taken by the TPM to process a notification received from a requestor that a requestor is no longer using a secret.

FIG. 7 is a flowchart showing steps taken by the TPM to process a notification received from a requestor that a requestor is no longer using a secret. Processing commences at 700 whereupon a determination is made as to whether a validation value is being used with notifications (decision 710). If validation values are being used, then decision 710 branches to "yes" branch 715 whereupon, at step 720, the TPM reads the validation value that the requester included with the scrub notification. In addition, the TPM compares the validation value provided by the requestor against the expected validation value that was stored in validation data memory 312 when the secret was released. A determination is made as to whether the validation value received from the requester matches the stored validation value, either directly or indirectly (decision 720). If an algorithm is being used, then the validation value provided by the requestor is processed by the algorithm and the resulting value is compared with the stored validation value to determine if they match. If no manipulation or computation of the validation value is being performed, then a simple comparison is made as to whether the validation value provided by the requester is the same as the validation value that was stored in validation data memory 312. If the validation values do not match, then decision 730 branches to "no" branch 735 whereupon processing ends at 740 without decrementing the counter. For example, if the validation value is not included in the notification or an incorrect validation value is used, this may indicate that a malevolent user is attempting to decrement the counters so that the counters remain in memory and are not scrubbed when the system is rebooted. By not decrementing the counter without proper validation, more assurance is provided that the secrets have actually been accounted for and scrubbed by the applications before the counter is decremented.

Returning to decision 730, if the validation value provided by the requester matches the stored validation value (decision 730 branching to "yes" branch 745), or if validation values are not being used (decision 710 branching to "no" branch 748 bypassing steps 720 to 740), then a determination is made as to whether localities are being used, as previously described in conjunction with FIG. 6. If localities are not being used, then decision 750 branches to "no" branch 755 whereupon, at step 760, the counter (secret counter 314 as implemented by non-locality counter 685) is decremented. On the other hand, if a locality is being used, then decision 750 branches to "yes" branch 765 whereupon, at step 770, a search is made of the counters in counters implementation 670 for the counter that corresponds to the requestor's locality. A determination is made as to whether the requestor's locality was found (decision 775). If the requestor's locality was not found, which again may indicate a malevolent user or process attempting to decrement the counters without actually scrubbing the secret from memory, then decision 775 branches to "no" branch 780 whereupon processing ends at 780 without decrementing the counter. However, if the requestor's locality was found, then decision 775 branches to "yes" branch 790 whereupon, at step 795, the counter corresponding to the requesters locality shown in counter implementation 670 is decremented.

Figure 8:
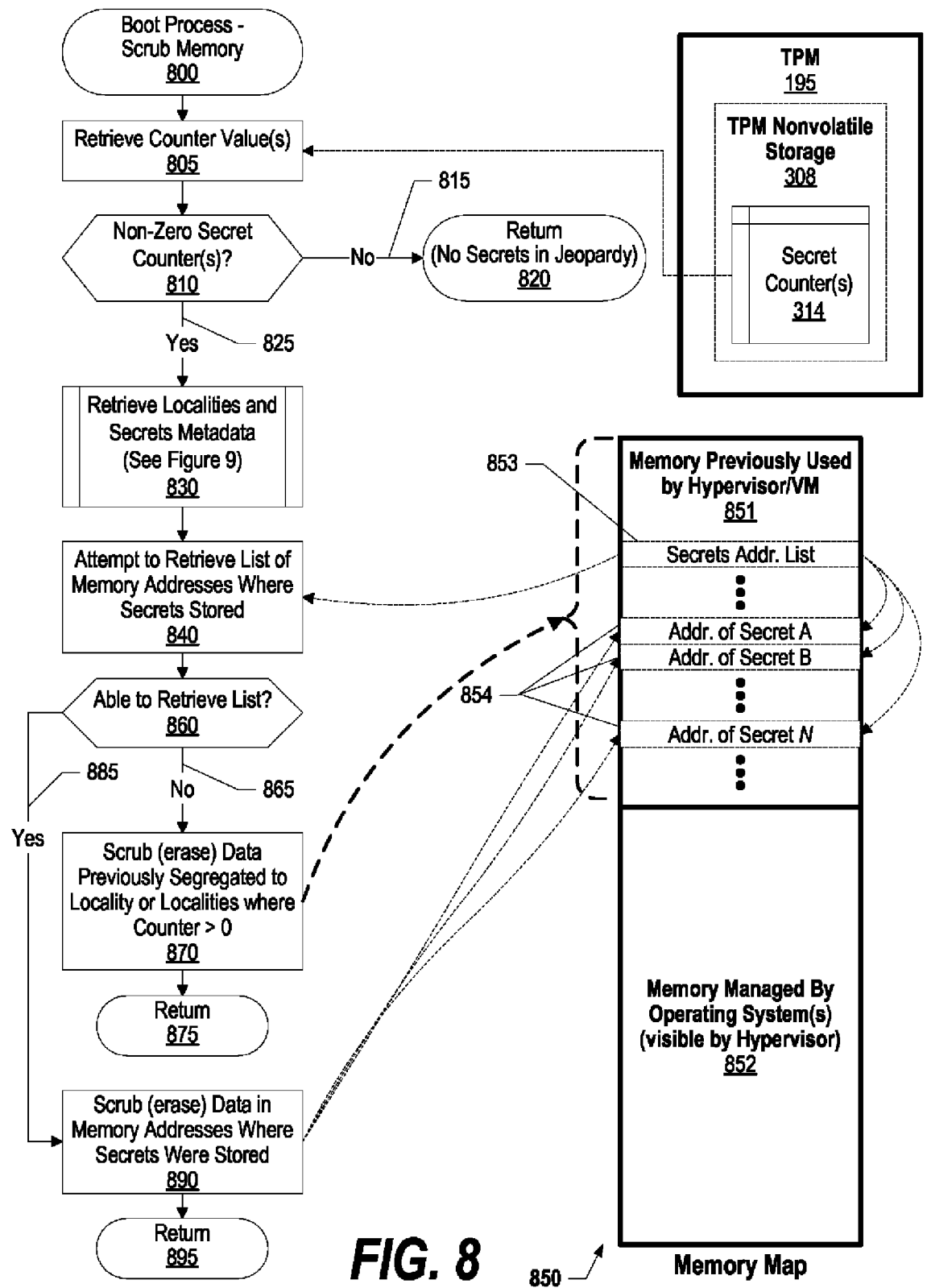
FIG. 8 is a flowchart showing steps performed during system bring-up to check if any secrets are at risk and writing over selective memory where secrets were stored during a prior usage of the computer system.

FIG. 8 is a flowchart showing steps performed during system bring-up to check if any secrets are at risk and writing over selective memory where secrets were stored during a prior usage of the computer system. Processing commences at 800 whereupon, at step 805, one or more counters are retrieved from counters memory area 314 within the TPM 195's nonvolatile storage 308. A determination is made as to whether there are any secret counters that are not equal to their initialization value, usually zero (decision 810). If all counters are at their initialization values (e.g., zero), then decision 810 branches to "no" branch 815 and processing returns at 820 because no secrets are in jeopardy.

On the other hand, if one or more counters are not equal to their initialization values, indicating that validated notifications were not received for all released secrets, then decision 810 branches to "yes" branch in order to scrub memory where the secret was stored. At predefined process 830, processing retrieves localities data and metadata regarding where secrets were stored in memory. Based on the data retrieved in predefined process 830, at step 840 an attempt is made to retrieve a list of memory addresses where the secrets were previously stored by requesters during the prior execution of the computer system. Memory map 850 shows a segregated memory map between various localities that indicates how memory was segregated between various localities during the prior execution of the computer system. In the example, two localities are shown: locality 851 is memory that was segregated to the hypervisor and any virtual machines (VMs) that were running under the hypervisor, and locality 852 is memory that was segregated to one or more operating systems that were running on the computer system. In the example shown, memory area 853 is where a list of the memory addresses where secrets were stored by a particular locality, in this case locality 851 which corresponds to the hypervisor. The various memory addresses where secrets were stored in the locality are depicted as memory addresses 854 (showing where any number of secrets A, B, and N were stored).

A determination is made as to whether the address list of where the secrets were stored by the locality was able to be retrieved (decision 860). If the list of addresses was not able to be retrieved (e.g., the data was corrupted, the locality did not keep a list of where the secret data was stored, etc.), then decision 860 branches to "no" branch 865 whereupon, at step 870, the memory in the entire locality is scrubbed (in this example, the memory in locality 851 is scrubbed). Moreover, if localities were not being used, then at step 870, the memory in the entire computer system would be scrubbed. Using a prior example, if the computer system were previously segregated into two localities with one locality having 1 GB of memory and running the hypervisor (e.g., locality 851), and the other locality having 7 GB and running the operating system and the user's application programs, then if the memory in the hypervisor's locality is scrubbed, then 1 GB of data is scrubbed rather than scrubbing all 8 GB of memory. However, if localities were not used, then the entire 8 GB of memory would be scrubbed at step 870. Processing thereafter returns to the calling process at 875.

Returning to decision 860, if the process is able to retrieve a list of the memory addresses where secrets were stored during the prior execution of the computer system, then decision 860 branches to "yes" branch 885 whereupon, at step 890 the data in the particular memory addresses (memory addresses 854) is scrubbed (e.g., by writing over the memory addresses with zeros, using a hardware command to clear the memory, etc.). Processing then returns to the calling process at 895.

Figure 9:
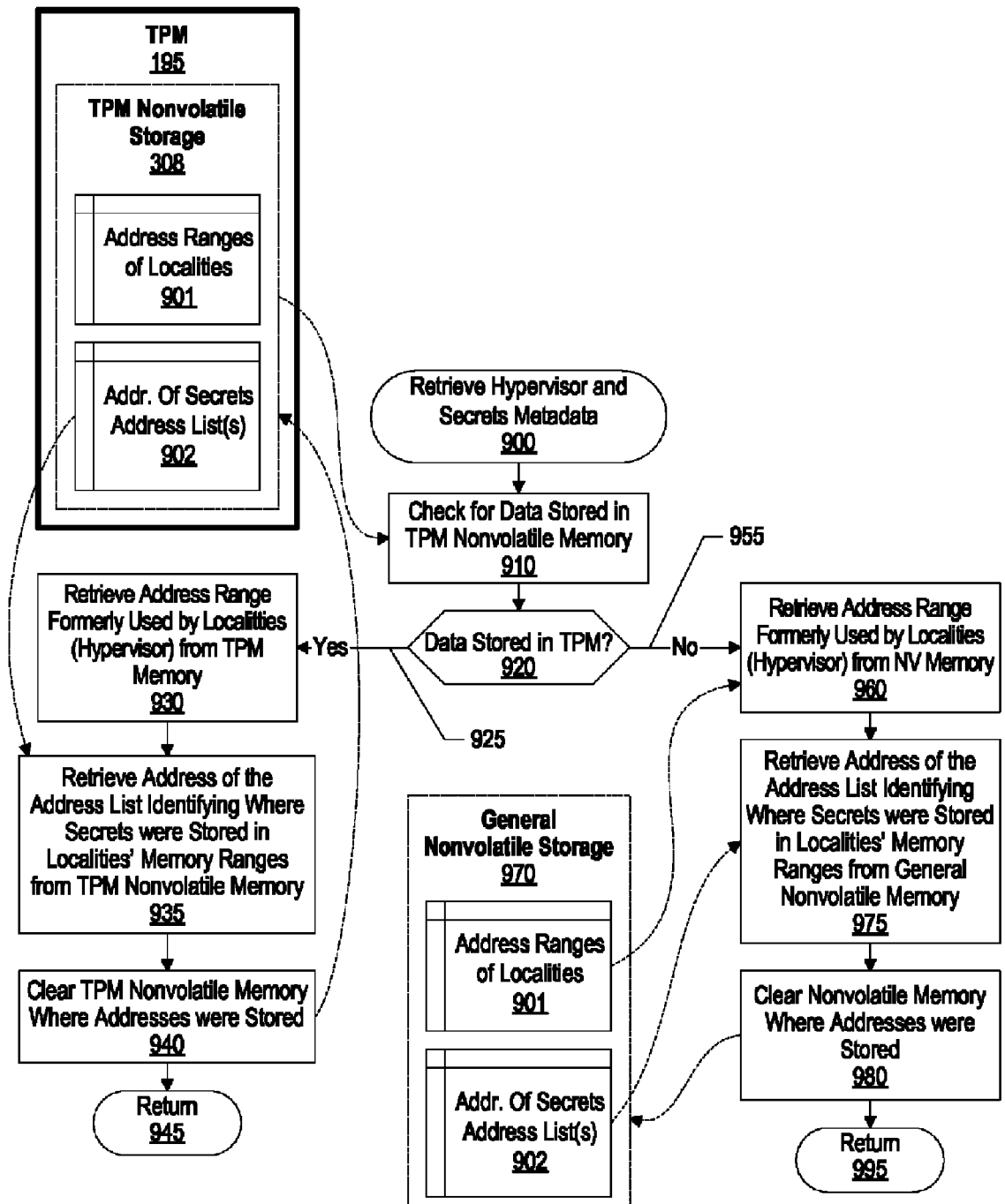
FIG. 9 is a flowchart showing steps taken by the bring-up process to retrieve the memory addresses where secrets were stored during the prior usage of the computer system.

FIG. 9 is a flowchart showing steps taken by the bring-up process to retrieve the memory addresses where secrets were stored during the prior usage of the computer system. Processing commences at 900 whereupon, at step 910, the TPM 195's nonvolatile storage 308 is checked for address ranges of localities 901 and addresses of secret address list(s) 902. If secrets were released to two localities (e.g., localities 851 and 852 shown in FIG. 8), then address ranges 901 would indicate the address ranges of the two localities. Likewise, if a list of where in the locality the secrets were stored is maintained by the localities, then address lists 902 would include one or more addresses for each locality pointing to where in the localities the secrets were stored.

A determination is made as to whether the address data was stored in the TPM (decision 920). If the address data is stored in the TPM, then decision 920 branches to "yes" branch 925 whereupon, at step 930, the address ranges that were formerly used by the various localities (e.g., the hypervisor's locality, etc.) are retrieved from the TPM's nonvolatile memory (memory area 901). At step 935, the address lists identifying where the secrets were stored in the various localities is retrieved from the TPM's nonvolatile memory (memory area 902). At step 940, the TPM's nonvolatile memory areas (901 and 902) are cleared, and processing returns at 945.

Returning to decision 920, if the address data is not stored in the TPM's nonvolatile storage, then decision 920 branches to "no" branch 955 whereupon, at step 960, the address ranges that were formerly used by the various localities (e.g., the hypervisor's locality, etc.) are retrieved from the general nonvolatile memory 970 (memory area 901). At step 975, the address lists identifying where the secrets were stored in the various localities is retrieved from general nonvolatile memory 970 (memory area 902). At step 980, the general nonvolatile memory 970 used to store memory areas 901 and 902 is cleared, and processing returns at 995.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system, the method comprising:
    initializing a counter maintained in a nonvolatile memory of a security module to an initialization value;
    receiving, at the security module, one or more requests for a secret that is secured by the security module, the requests received from one or more requestors;
    releasing, by the security module, the secret to the requestors, wherein the released secret is stored in one or more memory areas accessible by the requestors, and wherein the releasing further comprises providing a first validation value to the requestors in conjunction with releasing the secret to the requestors;
    incrementing the counter each time the secret is released by the security module;
    receiving, at the security module, one or more notifications from one or more of the requestors that the secret has been removed from the memory areas accessible by the requestors that sent the notifications, wherein the receiving further comprises receiving one or more second validation values from the requestors that sent the notifications;
    authenticating each of the received notifications, wherein the authenticating comprises validating that the second validation value corresponds to the first validation value;
    decrementing the counter maintained by the security module in the nonvolatile memory each time one of the notifications is received and authenticated; and
    rebooting the system after the secret was released to one or more of the requestors, during the rebooting:
        comparing the counter to the initialization value; and
        scrubbing a memory that includes the one or more memory areas in response to the counter being different than the initialization value.

2. The method of claim 1 further comprising:
    authenticating each of the received requests, wherein the secret is only released to the requestors after successful authentication.

3. The method of claim 1 wherein the comparing and scrubbing are performed by a secure BIOS module and wherein the security module is a Trusted Platform Module (TPM).

4. The method of claim 1 wherein the scrubbing further comprises:
    writing one or more predetermined values to a plurality of memory addresses within the memory, wherein the memory is a random access memory (RAM) that is used by a plurality of software applications running in the system.

5. The method of claim 1 wherein the system includes a plurality of localities, wherein the counter includes a plurality of counters with each of the plurality of counters corresponding to one of the localities, the method further comprising:
    initializing each of the counters corresponding to each of the localities to the initialization value;
    identifying the locality that corresponds to each requestor from which the requests for the secret are received and that corresponds to each requestor from which notifications are received, wherein the incrementing further includes incrementing the counter corresponding to the identified locality, and wherein the decrementing further includes decrementing the counter corresponding to the identified locality; and
    during the rebooting:
        comparing the counter corresponding to each locality with the initialization value; and
        scrubbing a memory that includes the one or more memory areas in response to at least one of the counters corresponding to one of the localities being different than the initialization value.

6. An information handling system comprising:
    one or more processors;
    a memory accessible by at least one of the processors;
    a nonvolatile storage area accessible by at least one of the processors;
    security module logic that is accessible by at least one of the processors, wherein the security module includes a nonvolatile memory, with a secret and a counter stored in the nonvolatile memory;
    a plurality of processes stored in the memory and executed by the processors, wherein one or more of the processes are requestors of the security module, and wherein each of the requestors is allocated a memory area from the memory;
    a set of instructions executed in order to perform actions of:
        initializing the counter to an initialization value;
        receiving, at the security module, one or more requests for the secret, the requests received from one or more of the requestors;
        releasing, by the security module, the secret to the requestors, wherein the released secret is stored in the requestors' memory areas, and wherein the releasing further comprises providing a first validation value to the requestors in conjunction with releasing the secret to the requestors;
        incrementing the counter each time the secret is released by the security module;
        receiving, at the security module, one or more notifications from one or more of the requestors that the secret has been removed from the respective requestors' memory areas, wherein the receiving further comprises receiving one or more second validation values from the requestors that sent the notifications;
        authenticating each of the received notifications, wherein the authenticating comprises validating that the second validation value corresponds to the first validation value;

decrementing the counter maintained by the security module in the nonvolatile memory each time one of the notifications is received and authenticated; and rebooting the information handling system after the secret was released to one or more of the requestors, during the rebooting:
- comparing the counter to the initialization value; and
- scrubbing the memory in response to the counter being different than the initialization value.

7. The information handling system of claim 6 wherein the set of instructions causes the processors to perform further actions comprising:
- authenticating each of the received requests, wherein the secret is only released to the requestors after successful authentication.

8. The information handling system of claim 6 wherein the comparing and scrubbing are performed by a secure BIOS module.

9. The information handling system of claim 6 wherein the scrubbing includes additional actions comprising:
- writing one or more predetermined values to a plurality of memory addresses within the memory.

10. The information handling system of claim 6 wherein the information handling system includes a plurality of localities, wherein the counter includes a plurality of counters with each of the plurality of counters corresponding to one of the localities, wherein the set of instructions causes the processors to perform further actions comprising:
- initializing each of the counters corresponding to each of the localities to the initialization value;
- identifying the locality that corresponds to each requestor from which the requests for the secret are received and that corresponds to each requestor from which notifications are received, wherein the incrementing further includes incrementing the counter corresponding to the identified locality, and wherein the decrementing further includes decrementing the counter corresponding to the identified locality; and
- during the rebooting:
  - comparing the counter corresponding to each locality with the initialization value; and
  - scrubbing a memory that includes the one or more memory areas in response to at least one of the counters corresponding to one of the localities being different than the initialization value.

11. A computer program product stored in a non-transitory computer readable medium, comprising functional descriptive material that, when executed by an information handling system, causes the information handling system to perform actions that include:
- initializing a counter maintained in a nonvolatile memory of a security module to an initialization value;
- receiving, at the security module, one or more requests for a secret that is secured by the security module, the requests received from one or more requestors;
- releasing, by the security module, the secret to the requestors, wherein the released secret is stored in one or more memory areas accessible by the requestors, and wherein the releasing further comprises providing a first validation value to the requestors in conjunction with releasing the secret to the requestors;
- incrementing the counter each time the secret is released by the security module;
- receiving, at the security module, one or more notifications from one or more of the requestors that the secret has been removed from the memory areas accessible by the requestors that sent the notifications, wherein the receiving further comprises receiving one or more second validation values from the requestors that sent the notifications;
- authenticating each of the received notifications, wherein the authenticating comprises validating that the second validation value corresponds to the first validation value;
- decrementing the counter maintained by the security module in the nonvolatile memory each time one of the notifications is received and authenticated; and
- rebooting the system after the secret was released to one or more of the requestors, during the rebooting:
  - comparing the counter to the initialization value; and
  - scrubbing a memory that includes the one or more memory areas in response to the counter being different than the initialization value.

12. The computer program product of claim 11 further comprising functional descriptive material that causes the information handling system to perform additional actions that include:
- authenticating each of the received requests, wherein the secret is only released to the requestors after successful authentication.

13. The computer program product of claim 11 wherein the scrubbing further comprises functional descriptive material that causes the information handling system to perform additional actions that include:
- writing one or more predetermined values to a plurality of memory addresses within the memory, wherein the memory is a random access memory (RAM) that is used by a plurality of software applications running in the system.

14. The computer program product of claim 11 wherein the system includes a plurality of localities, wherein the counter includes a plurality of counters with each of the plurality of counters corresponding to one of the localities, the computer program product further comprising functional descriptive material that causes the information handling system to perform additional actions that include:
- initializing each of the counters corresponding to each of the localities to the initialization value;
- identifying the locality that corresponds to each requestor from which the requests for the secret are received and that corresponds to each requestor from which notifications are received, wherein the incrementing further includes incrementing the counter corresponding to the identified locality, and wherein the decrementing further includes decrementing the counter corresponding to the identified locality; and
- during the rebooting:
  - comparing the counter corresponding to each locality with the initialization value; and
  - scrubbing a memory that includes the one or more memory areas in response to at least one of the counters corresponding to one of the localities being different than the initialization value.

* * * * *